United States Patent
Kamiya et al.

(10) Patent No.: US 9,671,680 B2
(45) Date of Patent: Jun. 6, 2017

(54) IMAGING APPARATUS

(71) Applicant: CASIO COMPUTER CO., LTD., Shibuya-ku, Tokyo (JP)

(72) Inventors: Susumu Kamiya, Kawasaki (JP); Yosuke Nagayama, Tokyo (JP); Shinobu Sugioka, Ageo (JP); Takayuki Satou, Uenohara (JP); Takashi Tateno, Kawasaki (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/795,639

(22) Filed: Jul. 9, 2015

(65) Prior Publication Data
US 2016/0041456 A1 Feb. 11, 2016

(30) Foreign Application Priority Data
Aug. 7, 2014 (JP) ................ 2014-161184

(51) Int. Cl.
*G03B 17/56* (2006.01)
*G03B 15/03* (2006.01)
*G03B 17/04* (2006.01)

(52) U.S. Cl.
CPC ............. *G03B 17/04* (2013.01); *G03B 15/03* (2013.01); *G03B 17/561* (2013.01); *G03B 17/565* (2013.01); *G03B 17/566* (2013.01)

(58) Field of Classification Search
CPC .... G03B 17/568; G03B 17/566; G03B 15/03; G03B 17/565; G03B 17/561
USPC ............... 396/422, 424, 428, 535; 348/373; 206/316.1, 316.2; 224/269, 270; 379/446, 454, 455; 455/575.6
See application file for complete search history.

(56) References Cited

U.S. PATENT DOCUMENTS

| | | | | |
|---|---|---|---|---|
| 9,264,599 B2* | 2/2016 | Reid | ............... | F16M 11/00 |
| 9,332,170 B1* | 5/2016 | Khalili | ............... | G03B 17/563 |
| 2006/0257138 A1* | 11/2006 | Fromm | ............... | F16M 13/04 |
| | | | | 396/420 |
| 2014/0368731 A1* | 12/2014 | Hyers | ............... | H04N 5/2252 |
| | | | | 348/374 |

FOREIGN PATENT DOCUMENTS

JP      2002237880 A     8/2002

\* cited by examiner

*Primary Examiner* — Rochelle-Ann J Blackman
(74) *Attorney, Agent, or Firm* — Holtz, Holtz & Volek PC

(57) ABSTRACT

An imaging apparatus includes the following. A camera unit; a remote control unit which controls the camera unit; a detachable mechanism which detachably connects the camera unit and the remote control unit; and a shaped portion provided on the detachable mechanism to fix the camera unit in a predetermined location.

13 Claims, 7 Drawing Sheets

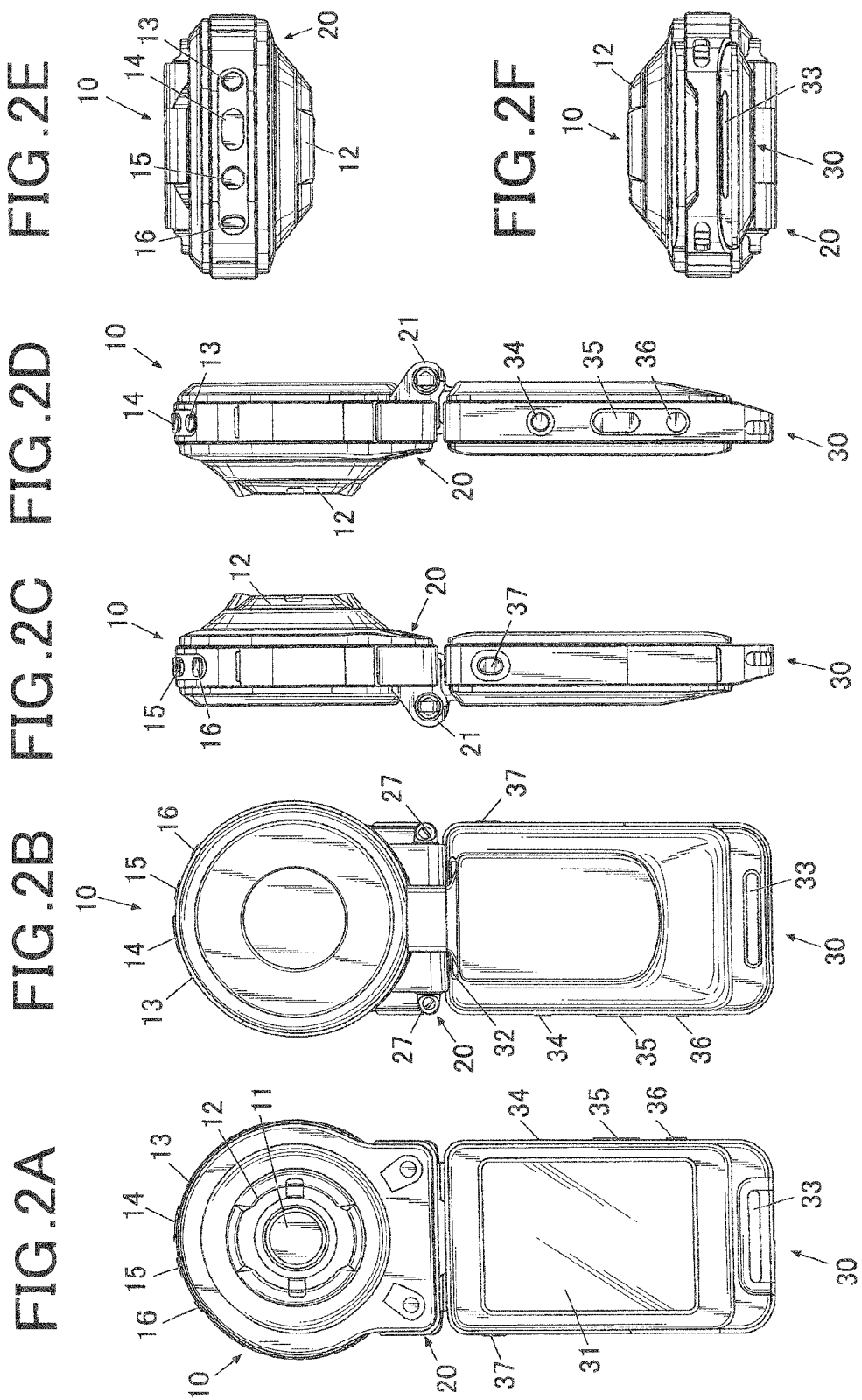

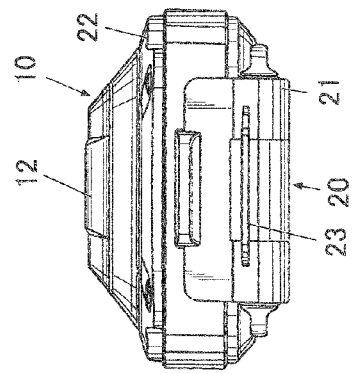
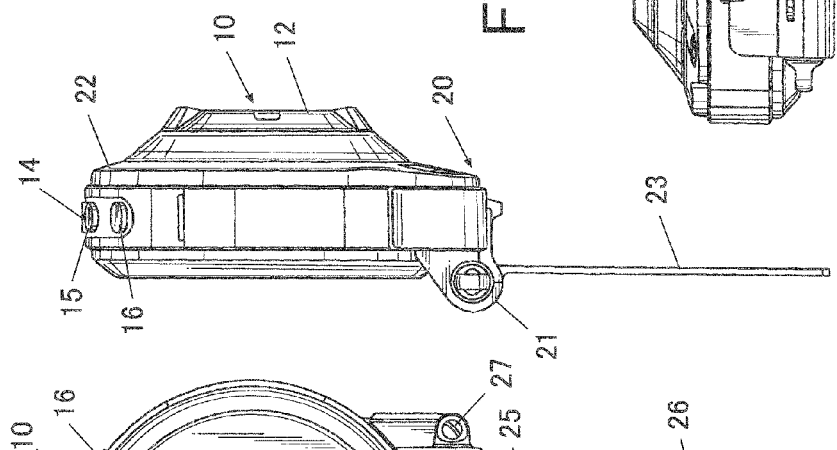
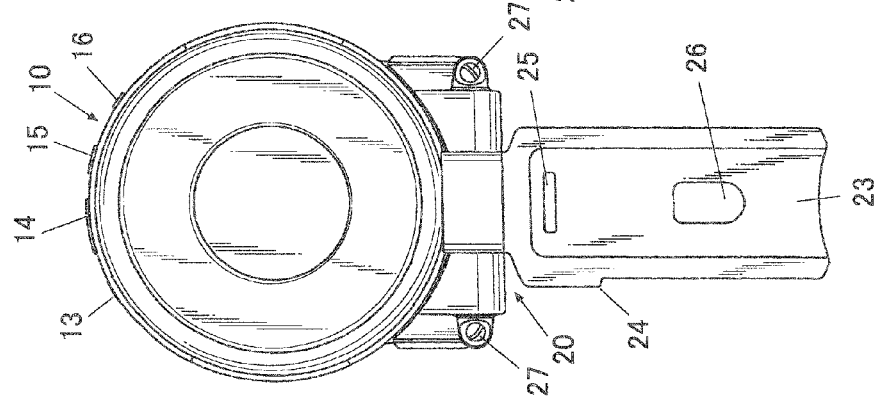
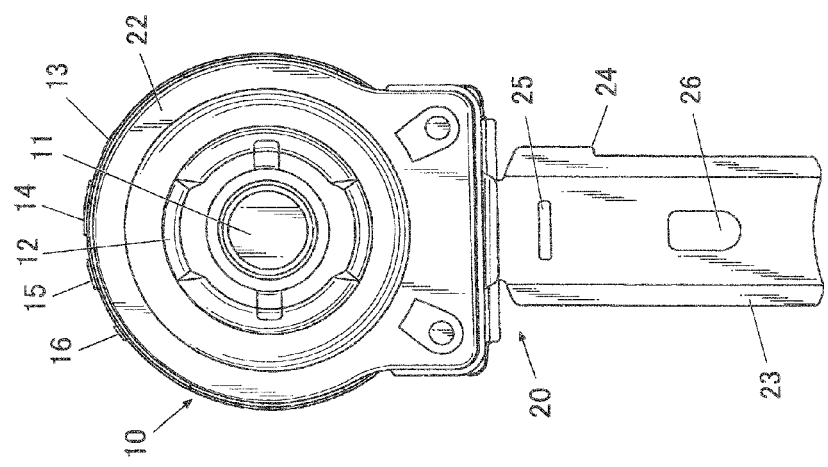

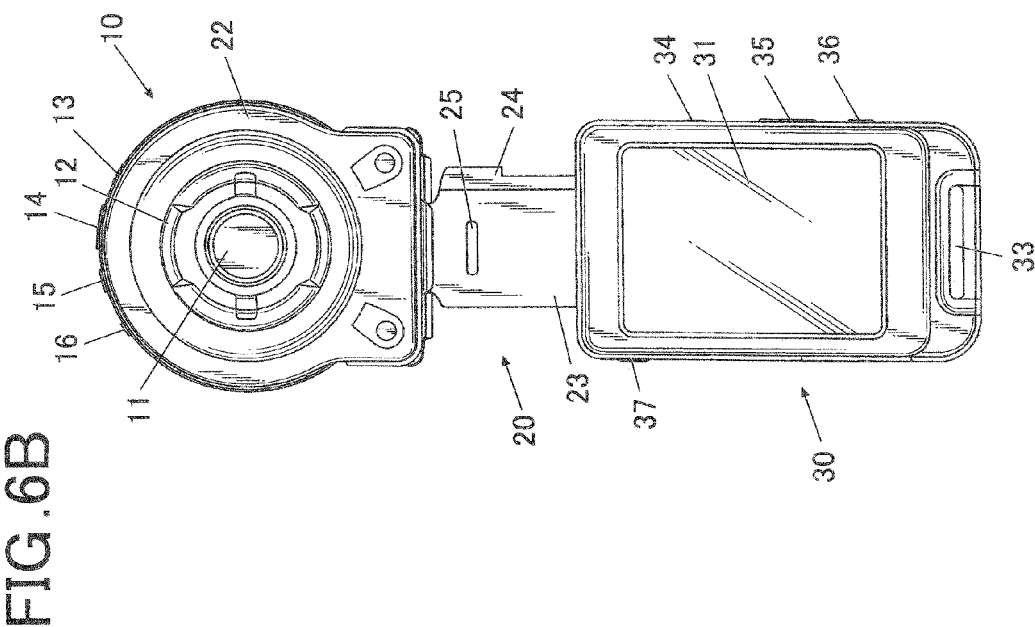
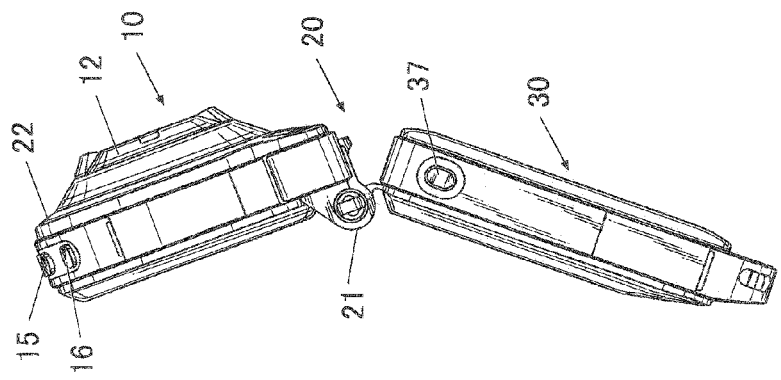

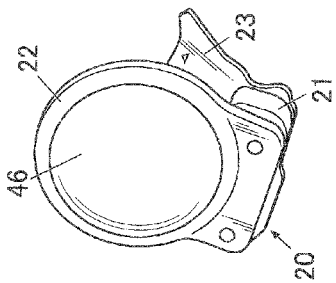
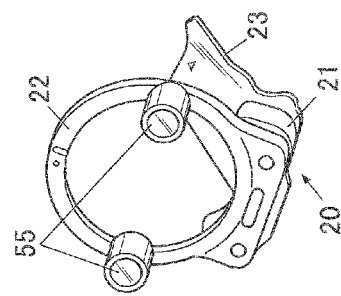
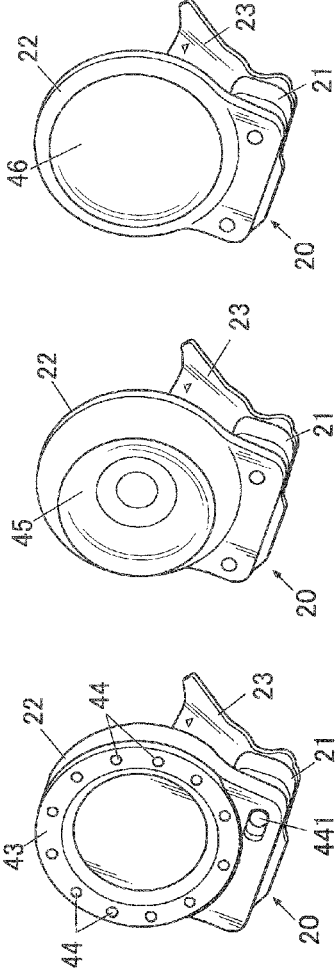
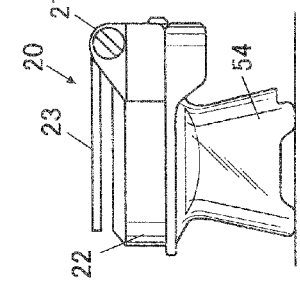
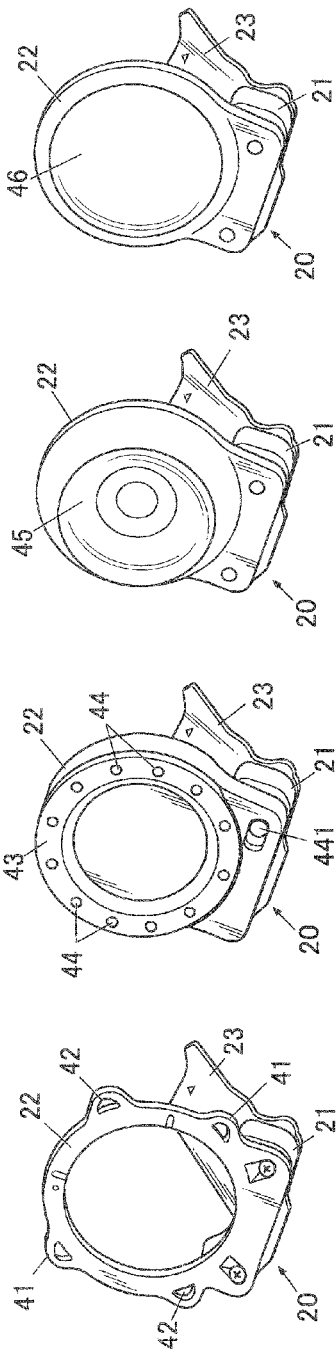
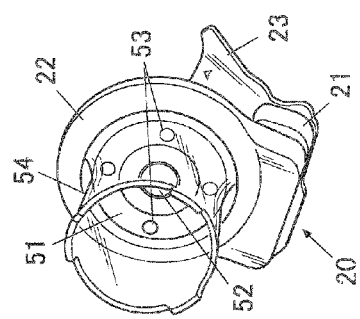
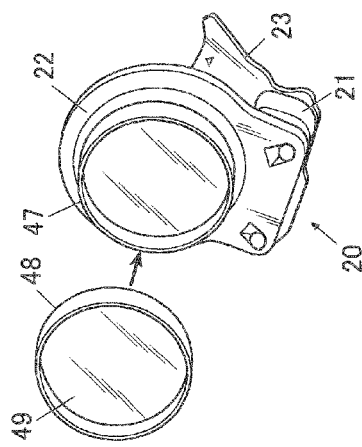

IMAGING APPARATUS

BACKGROUND OF THE INVENTION

Field of the Invention

The present invention relates to an imaging apparatus in which a camera unit is connected detachably to a remote control unit which remotely controls the camera unit.

Description of the Related Art

Conventionally, in a mobile telephone with a camera as described in Japanese Patent Application Laid-Open Publication No. 2002-237880, an imaging apparatus includes a mechanism for folding the apparatus. For such imaging apparatus, Japanese Patent Application Laid-Open Publication No. 2002-237880 describes a folding unit including a telephone main body and a camera provided to the telephone so that the camera can be detached/attached and the apparatus can be folded.

SUMMARY OF THE INVENTION

One of the main objects of the present invention is to realize a capturing style with high degree of freedom when using a capturing apparatus in which a remote control unit which controls the imaging apparatus is detachably connected.

According to an aspect of the present invention, there is provided an imaging apparatus including:
- a camera unit;
- a remote control unit which controls the camera unit;
- a detachable mechanism which detachably connects the camera unit and the remote control unit; and
- a shaped portion provided on the detachable mechanism to fix the camera unit in a predetermined location.

BRIEF DESCRIPTION OF THE DRAWINGS

The present invention and the above-described objects, features and advantages thereof will become more fully understood from the following detailed description with the accompanying drawings and wherein;

FIG. 2A is a front view of the imaging apparatus shown in FIG. 1A and FIG. 1B;

FIG. 2B is a back view of the imaging apparatus;

FIG. 2C is a side view of the imaging apparatus;

FIG. 2D is another side view of the imaging apparatus;

FIG. 2E is a planar view of the imaging apparatus;

FIG. 2F is a bottom view of the imaging apparatus;

FIG. 5A is a front view of the camera unit and the detachable mechanism shown in FIG. 4A and FIG. 4B;

FIG. 5B is a back view of the camera unit and the detachable mechanism;

FIG. 5C is a side view of the camera unit and the detachable mechanism;

FIG. 5D is a bottom view of the camera unit and the detachable mechanism;

FIG. 6A is a side view of the camera unit and the remote control unit in a rotated state;

FIG. 6B is a front view when a connection between the camera unit and the remote control unit is released;

FIG. 7A shows an example of an auxiliary member attached to the ring shaped cover, and shows an anchor hole which is formed;

FIG. 7B shows an example of the auxiliary member and shows a ring member with LED lights fixed to the ring shaped cover portion;

FIG. 7C shows an example of the auxiliary member and shows a fish eye lens fixed to the ring shaped cover portion;

FIG. 7D shows an example of the auxiliary member and shows a half mirror for self-capturing fixed to the ring shaped cover;

FIG. 7E shows an example of the auxiliary member and shows a ring member for attaching a lens filter fixed to the ring shaped cover;

FIG. 7F shows an example of the auxiliary member and shows providing a macro-lens in a center portion and a plurality of LED lights in a surrounding area;

FIG. 7G shows an example of the auxiliary member and shows a state in which a hood is attached to the state shown in FIG. 7F, and the subject is placed below the imaging apparatus; and FIG. 7H shows an example of the auxiliary member and laser pointers are provided.

DETAILED DESCRIPTION OF THE PREFERRED EMBODIMENTS

An embodiment of the present invention is described in detail with reference to the drawings.

(Embodiment)

Figure 1A:
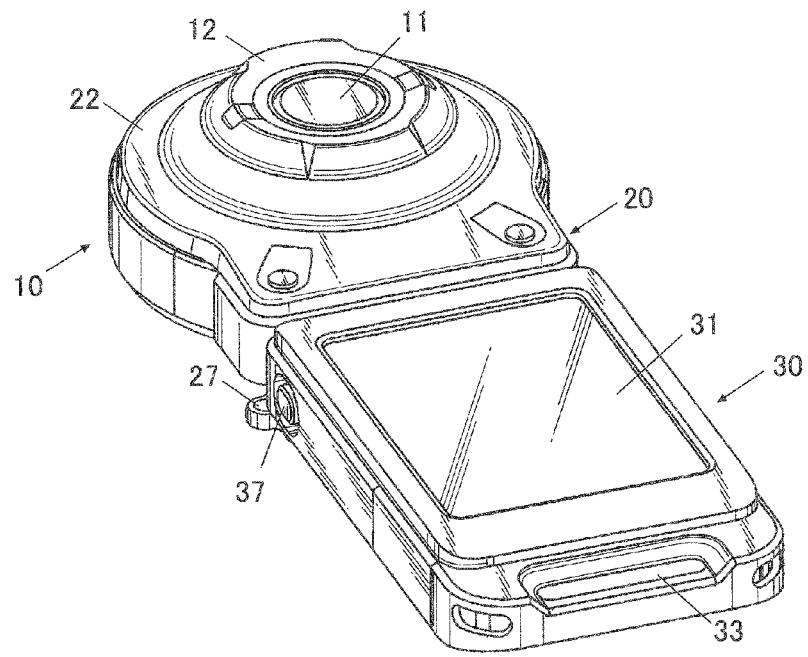
FIG. 1A shows a configuration of an embodiment of an imaging apparatus applying the present invention and is a perspective view of a connected state of a camera unit and a remote control unit viewed from a lens and a display side.
Figure 1B:
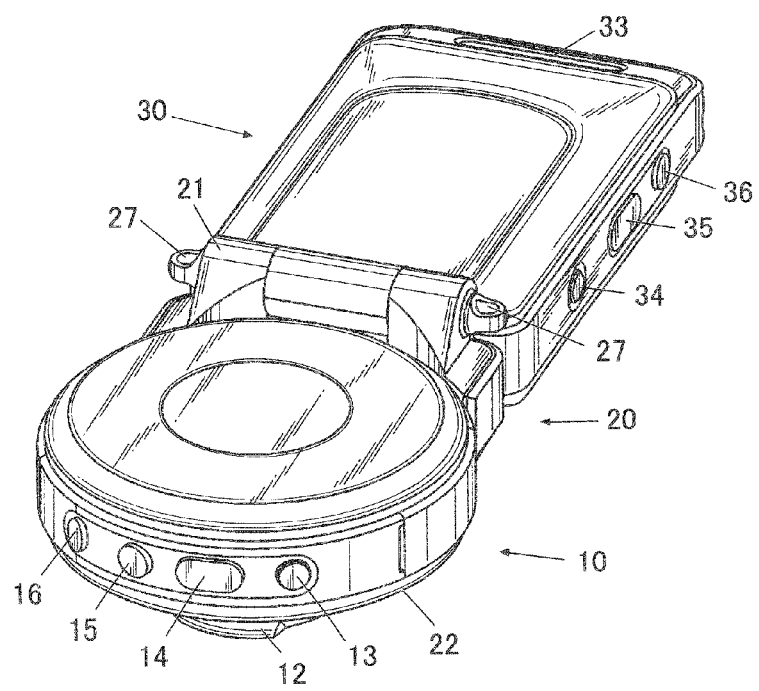
FIG. 1B shows a configuration of an embodiment of an imaging apparatus applying the present invention and is a perspective view of a connected state of a camera unit and a remote control unit viewed from a back side.
Figure 3A:
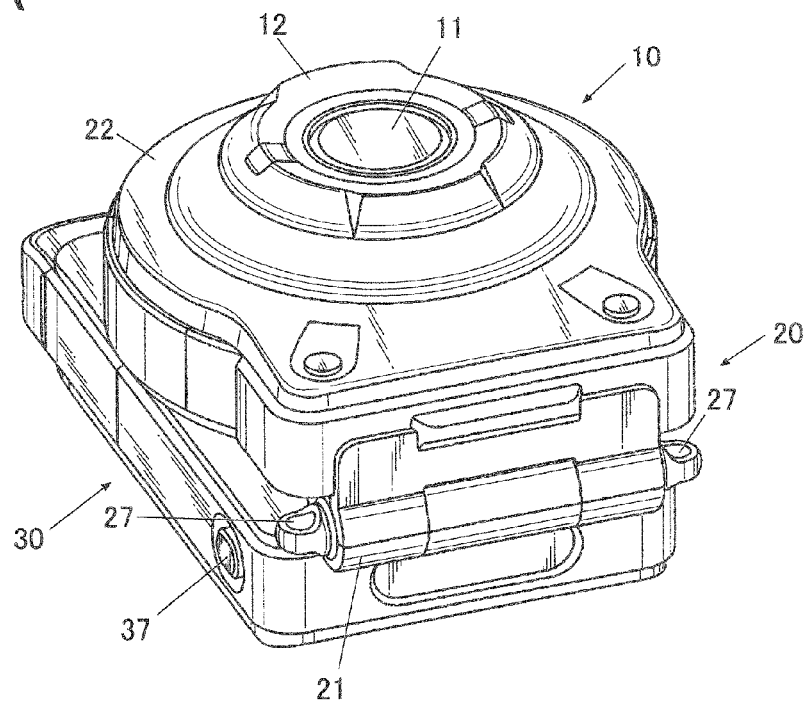
FIG. 3A is a perspective view of a folded and overlapped state of the camera unit and the remote control unit of the capturing apparatus viewed from the lens side.
Figure 3B:
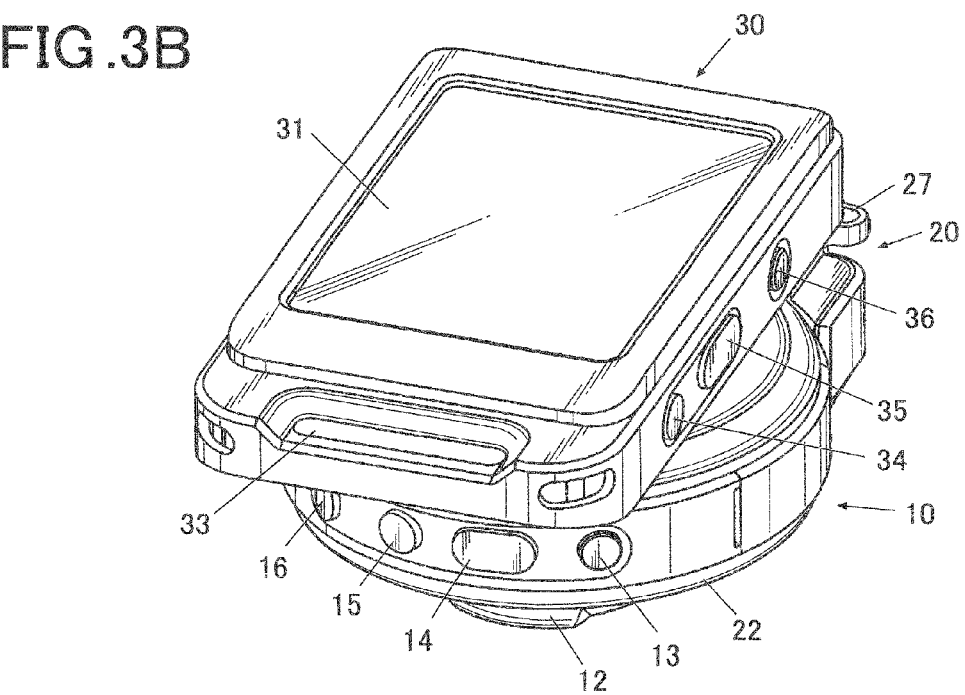
FIG. 3B is a perspective view of a folded and overlapped state of the camera unit and the remote control unit of the capturing apparatus viewed from the display side.

FIG. 1A and FIG. 1B show a connected state of a camera unit 10 and a remote control unit 30 as a configuration of an embodiment of the imaging apparatus applying the present invention; FIG. 2A to FIG. 2F show the imaging apparatus viewed from 6 points; and FIG. 3A and FIG. 3B show the camera unit 10 and the remote control unit 30 in a folded and overlapped state. 11 represents a lens, 20 represents a detachable mechanism, 21 represents a hinge connecting unit, and 31 represents a display.

As shown in the diagram, the imaging apparatus includes the camera unit 10 provided with the lens 11 on one side, and the remote control unit 30 provided with a display 31 on one side detachably connected to the camera unit 10 through the detachable mechanism 20. The camera unit 10 and the remote control unit 30 can be rotated by the hinge connecting unit 21 which is a rotating mechanism provided in the detachable mechanism 20.

The camera unit 10 is provided with a lens 11 in a substantial disk shape on one side and a protector 12 which surrounds the lens 11 to protect the lens 11.

The camera unit 10 is provided with a power source button 13 along an outer peripheral surface, a shutter button 14, a moving image start/end button 15, and a connection release button 16.

Regarding the case of the camera unit 10, the side provided with the lens 11 and the peripheral surface portion is a resin case and the opposite side is a metal case. The case camera unit 10 includes an antenna (not shown) around the lens 11.

The remote control unit 30 is substantially a rectangular box shape. A detachable slit 32 is formed in one small edge portion and an attachment slit 33 for a carabiner, etc. is formed in the other small edge portion.

The remote control unit 30 is provided with a power source button 34, a shutter button 35, and a moving image start/end button 36 in one long edge portion and a connection release button 37 in the other long edge portion.

The above camera unit 10 and the remote control unit 30 are connected by wireless communication.

Figure 4A:
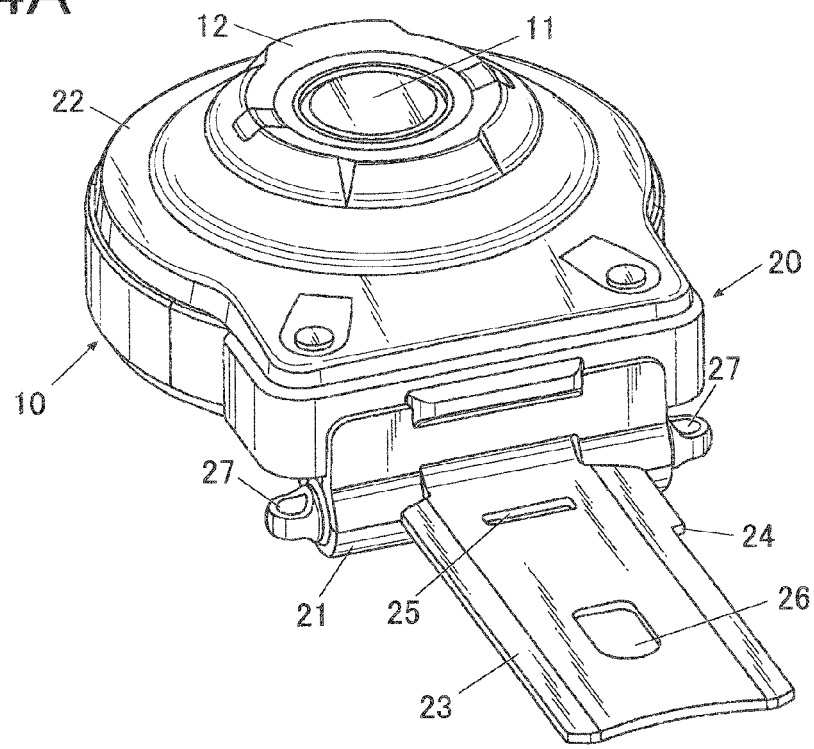
FIG. 4A is a perspective view of the camera unit of the imaging apparatus and a detachable mechanism viewed from the lens side.
Figure 4B:
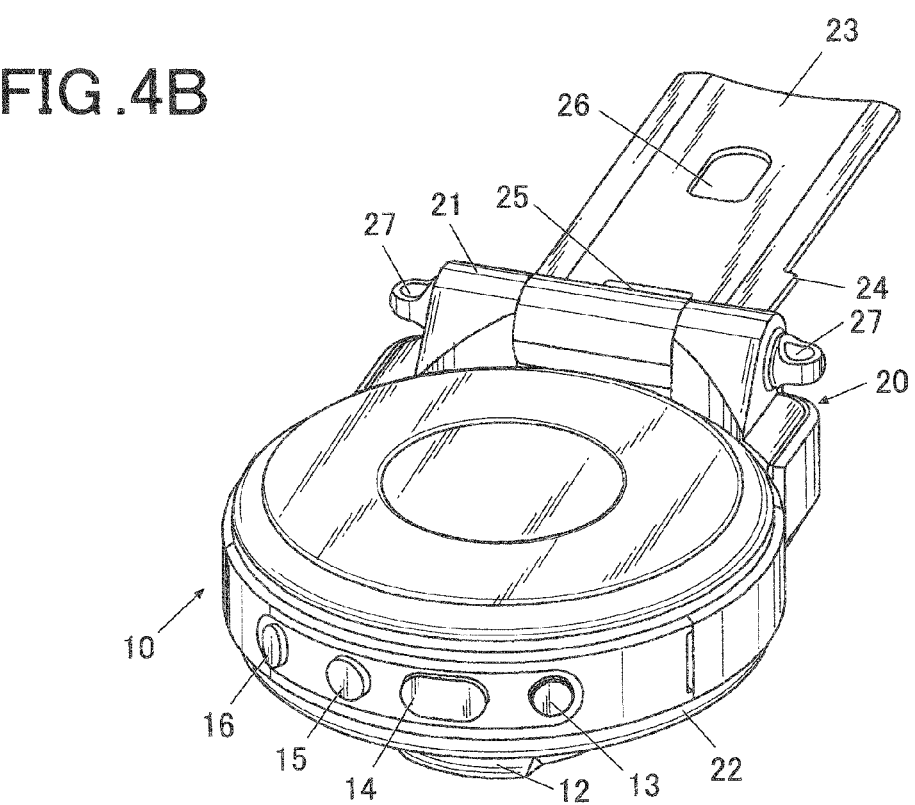
FIG. 4B is a perspective view of the camera unit of the imaging apparatus and the detachable mechanism viewed from the back side.

FIG. 4A and FIG. 4B show the camera unit 10 and the detachable mechanism 20, and FIG. 5A to FIG. 5D show 4 views of the above. 22 represents a ring shaped cover, and 23 represents a metal plate.

As shown in the diagram, the detachable mechanism 20 combines the ring shaped cover 22 made from resin with the metal plate 23 by the hinge connecting unit 21 so that folding is possible. The ring shaped cover 22 can be attached and detached around the lens 11 of the camera unit 10 and the metal plate 23 can be inserted in the detachable slit 32 of the remote control unit 30.

Here, when the ring shaped cover 22 and the metal plate 23 are rotated and opened 180°, the hinge connecting unit 21 of the detachable mechanism 20 is locked at both edges and this state is maintained.

The ring shaped cover 22 of the detachable mechanism 20 is connected to the camera unit 10 with a fixing mechanism by a bayonet type connection which can be locked by a plurality of nails and a stopper (not shown). The camera unit 10 can be attached and detached by rotating the ring shaped cover 22 and the camera unit 10.

After the camera unit 10 and the ring shaped cover 22 are connected, the above is locked with a pin (not shown) provided in the camera unit 10. With this, unprepared falling can be prevented and the angle of view of the lens (vertical and horizontal position) can be fixed.

The lock can be released by pressing the connection release button 16 of the camera unit 10, and the camera unit 10 can be separated from the ring shaped cover 22.

A wide step portion 24 is formed toward the base of one side of the metal plate 23 of the detachable mechanism 20 and this prevents reverse insertion into the detachable slit 32 of the remote control unit 30.

A horizontally long fixing slit 25 is formed in the base of the metal plate 23 as the shape to be fixed to the remote control unit 30.

The above-described metal plate 23 is inserted in the detachable slit 32 of the remote control unit 30. The metal plate 23 is fixed with the horizontally long fixing slit 25 by the lock function (not shown) provided in the remote control unit 30. This prevents the metal plate 23 from falling out of the remote control unit 30.

The lock is released by pressing the connection release button 37 of the remote control unit 30. As shown in FIG. 6B, the metal plate 23 can be separated from the remote control unit 30.

A vertically long tripod fixing hole 26 is formed in the metal plate 23 as a shaped portion to fix the camera unit 10 in a predetermined location (for example, tripod).

The shaped portion 26 to fix the tripod and the shaped portion 25 to fix the remote control unit 30 can be the same hole or slit or a different hole or slit.

A string passing ring 27 is provided in both edge portions of the hinge connecting unit 21 of the detachable mechanism 20 to pass the string for placing the apparatus around the neck.

In the state in which the camera unit 10 and the remote control unit 30 are connected by the detachable mechanism 20, as shown in FIG. 1A and FIG. 1B and FIG. 2A to FIG. 2F, when the camera unit 10 and the remote control unit 30 are in a straight state, the lens 11 and the display 31 are on the same plane, and this is a state suitable for self-capturing.

For example, as shown in FIG. 6A, the camera unit 10 and the remote control unit 30 can be rotated freely in any angle by the hinge connecting unit 21.

Specifically, when the camera unit 10 and the remote control unit 30 are rotated 180°, as shown in FIG. 3A and FIG. 3B, the lens 11 and the display 31 face opposite directions, and the apparatus can be operated as a typically used camera.

As shown in FIG. 4A and FIG. 4B, and FIG. 5A to FIG. 5D, when the remote control unit 30 is detached from the camera unit 10, the metal plate 23 of the detachable mechanism 20 formed together with the camera unit 10 becomes a stand. With this, the hinge connecting unit 21 can be opened at any angle of elevation and the camera unit 10 can be used for capturing in a placed state.

Next, the effects of the ring shaped cover 22 of the detachable mechanism 20 are described below.

1) It is possible to secure a space to reliably grip the ring shaped cover 22 attached on the upper surface of the substantially disk shaped camera unit 10. With this, when the metal plate 23 is inserted or pulled out from the detachable slit 32 of the remote control unit 30, it is possible to grip the ring shaped cover 22 attached to the upper surface of the substantially disk shaped camera unit 10. Consequently, there is no need to touch the camera unit 10.
2) The ring shaped cover 22 is attached to the upper surface of the substantially disk shaped camera unit 10. Consequently, this leads to enhancing the strength of the structure of the camera unit 10.
3) The ring shaped cover 22 is connected to the upper surface side of the camera unit 10. Consequently, there is no influence to the size of the outer diameter of the camera unit 10.
4) The string passing ring 27 can be provided on both edges of the hinge connecting unit 21.
5) The metal plate 23 which is a connecting component becomes a stand, and capturing can be performed placing the camera unit 10 at any angle.
6) The bayonet type connection between the camera unit 10 and the ring shaped cover 22 can be used so as to be able to switch the direction of the lens 11 at 90°.
7) When the indicator of the angle of view is provided surrounding the lens 11 of the camera unit 10, the rotating angle of the camera unit 10 with respect to the ring shaped cover 22 can be understood.
8) The ring shaped cover 22 holding the camera unit 10 is made from resin. Consequently, the weight can be made lighter. Moreover, it is possible to prevent reduction of the sensitivity of the antenna of the upper surface of the camera unit 10.

According to the above described embodiments, the shaped portion 26 which fixes the camera unit 10 to the tripod is provided on the detachable mechanism 20 which enables the camera unit 10 and the remote control unit 30 to be attached and detached. Consequently, the camera unit 10 can be detached from the remote control unit 30 and can be used fixed to the tripod.

(Modification)

Regarding the detachable mechanism 20, the ring shaped cover 22 is mounted to the camera unit 10 from the front face side. Therefore, auxiliary members which assist capturing can be added to the ring shaped cover 22 portion, and with this, the variation of functions can be expanded.

FIG. 7A to FIG. 7H show the auxiliary members which assist capturing added to the ring shaped cover 22 of the detachable mechanism 20 and the variation of functions due to the above.

FIG. 7A shows a plurality of projecting portions 41 (4 radially provided in the illustrated example) formed around the ring shaped cover 22 and forming an anchor hole 42 in the projecting portion 41.

The plurality of anchor holes 42 (4 radially provided in the illustrated example) surrounding the ring shaped cover 22 is used so that, for example, the camera unit 10 can be hooked and fixed to a bar shaped projection.

FIG. 7B shows a ring member 43 with a large number of LED lights 44 fixed overlapped on the front surface of the ring shaped cover 22 as an illuminating member to illuminate the subject.

A power source so that the LED light 44 emits light is included in the hinge connecting unit 21 of the ring shaped cover 22 shown in FIG. 7B. When a sliding switch 441 is slid and this operation is detected, the LED light 44 is controlled to switch between light emission and no light emission. For example, the light emitted from the large number of LED lights 44 provided in the ring member 43 on the ring shaped cover 22 can be used as, for example, an auxiliary light for AF (auto-focus).

FIG. 7C shows a lens for providing an optical special effect such as a fish eye lens 45 fixed to the front surface of the ring shaped cover 22.

With this, special capturing using such fish eye lens 45 provided on the ring shaped cover 22 is possible.

FIG. 7D shows a half mirror 46 for self-capturing fixed on the front surface of the ring shaped cover 22.

With this, self-capturing is possible by looking at the half mirror 46 provided on the ring shaped cover 22.

FIG. 7E shows a ring member 47 including a female screw structure for attaching a lens filter 49 fixed on the front surface of the ring shaped cover 22.

A ring shaped attachment 48 provided with an all-purpose lens filter 49 can be screwed and attached to the ring member 47 provided on the ring shaped cover 22.

FIG. 7F shows a disk member 51 provided with a macro-lens 52 at the center and a plurality of LED lights 53 in the surrounding area (4 radially in the illustrated example) fixed to the inside of the ring shaped cover 22 as a member for close capturing. A hood 54 is provided on the front surface of the disk member 51.

FIG. 7G shows a state in which the hood 54 provided on the ring shaped cover 22 as shown in FIG. 7F is provided facing down toward the subject. With this, the subject can be captured at a close distance with the macro-lens 52 provided on the ring shaped cover 22.

In this case, the LED light 53 surrounding the macro-lens 52 emits light to irradiate the subject so that capturing at a close distance is possible.

FIG. 7H shows a plurality of laser pointers 55 (2 on opposite ends in the diameter direction in the illustrated example) provided on the front face of the ring shaped cover 22 as the light emitting mechanism to clarify the imaging optical axis.

The capturing can be performed clearly showing the imaging optical axis by emitting light to a far subject with the plurality of laser pointers 55 (2 on opposite ends in the diameter direction in the illustrated example) provided on the ring shaped cover 22.

(Other Modifications)

The above described embodiment includes a substantially disk shaped camera unit and a substantially box shaped remote control unit. The present invention is not limited to the above, and the shape and configuration of the camera unit and the remote control unit is not limited.

The shape and configuration of the detachable mechanism, the configuration of the rotating mechanism and the fixing mechanism, and the shape of the fixing shaped portion can be determined freely. The specific detailed configuration can be suitably changed.

Although various exemplary embodiments have been shown and described, the invention is not limited to the embodiments shown. Therefore, the scope of the invention is intended to be limited solely by the scope of the claims that follow and its equivalents.

The entire disclosure of Japanese Patent Application No. 2014-161184 filed on Aug. 7, 2014 including specification, claims, drawings and abstract are incorporated herein by reference in its entirety.

What is claimed is:

1. An imaging apparatus comprising:
a camera unit;
a remote control unit which controls the camera unit; and
a detachable mechanism which detachably connects the camera unit and the remote control unit to each other;
wherein the detachable mechanism includes a first shaped portion to fix the camera unit in a predetermined location, and
wherein the detachable mechanism is directly connectable to both of the camera unit and the remote control unit by storing a member including the first shaped portion in a storage provided in the remote control unit.

2. The imaging apparatus according to claim 1, wherein the detachable mechanism further includes a shaped portion to fix the remote control unit when the camera unit is connected to the remote control unit.

3. The imaging apparatus according to claim 1, wherein, the detachable mechanism further includes a rotating mechanism so that the camera unit can be rotated and folded with respect to the remote control unit.

4. The imaging apparatus according to claim 1, wherein, the detachable mechanism further includes a fixing mechanism to fix an auxiliary member to assist capturing.

5. The imaging apparatus according to claim 4, wherein, the auxiliary member includes an anchor to position the camera unit.

6. The imaging apparatus according to claim 4, wherein the auxiliary member includes an illuminating member to illuminate the subject.

7. The imaging apparatus according to claim 4, wherein the auxiliary member includes a lens member to provide an optical special effect to a captured image.

8. The imaging apparatus according to claim 4, wherein the auxiliary member includes a half mirror.

9. The imaging apparatus according to claim 4, wherein the auxiliary member includes a female screw structure to attach a lens filter is attachable.

10. The imaging apparatus according to claim 4, wherein the auxiliary member includes a member for close capturing.

11. The imaging apparatus according to claim 4, wherein the auxiliary member includes a light irradiating mechanism to clearly show an imaging optical axis.

12. The imaging apparatus according to claim 1, wherein, other than the detachable mechanism, the camera unit does not include a connection unit to enable physical connection with the remote control unit.

13. The imaging apparatus according to claim 1, wherein, other than the detachable mechanism, the remote control unit does not include a connection unit to enable physical connection with the camera unit.

* * * * *

UNITED STATES PATENT AND TRADEMARK OFFICE
CERTIFICATE OF CORRECTION

PATENT NO. : 9,671,680 B2
APPLICATION NO. : 14/795639
DATED : June 6, 2017
INVENTOR(S) : Susumu Kamiya et al.

It is certified that error appears in the above-identified patent and that said Letters Patent is hereby corrected as shown below:

In the Claims

Column 6, Line 46, after "a" insert --second--.

Column 6, Line 55, after "assist" insert --in image--.

Column 6, Line 61, delete "the" and insert --a--.

Column 7, Line 3, delete "attach" and insert --which--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*